United States Patent Office

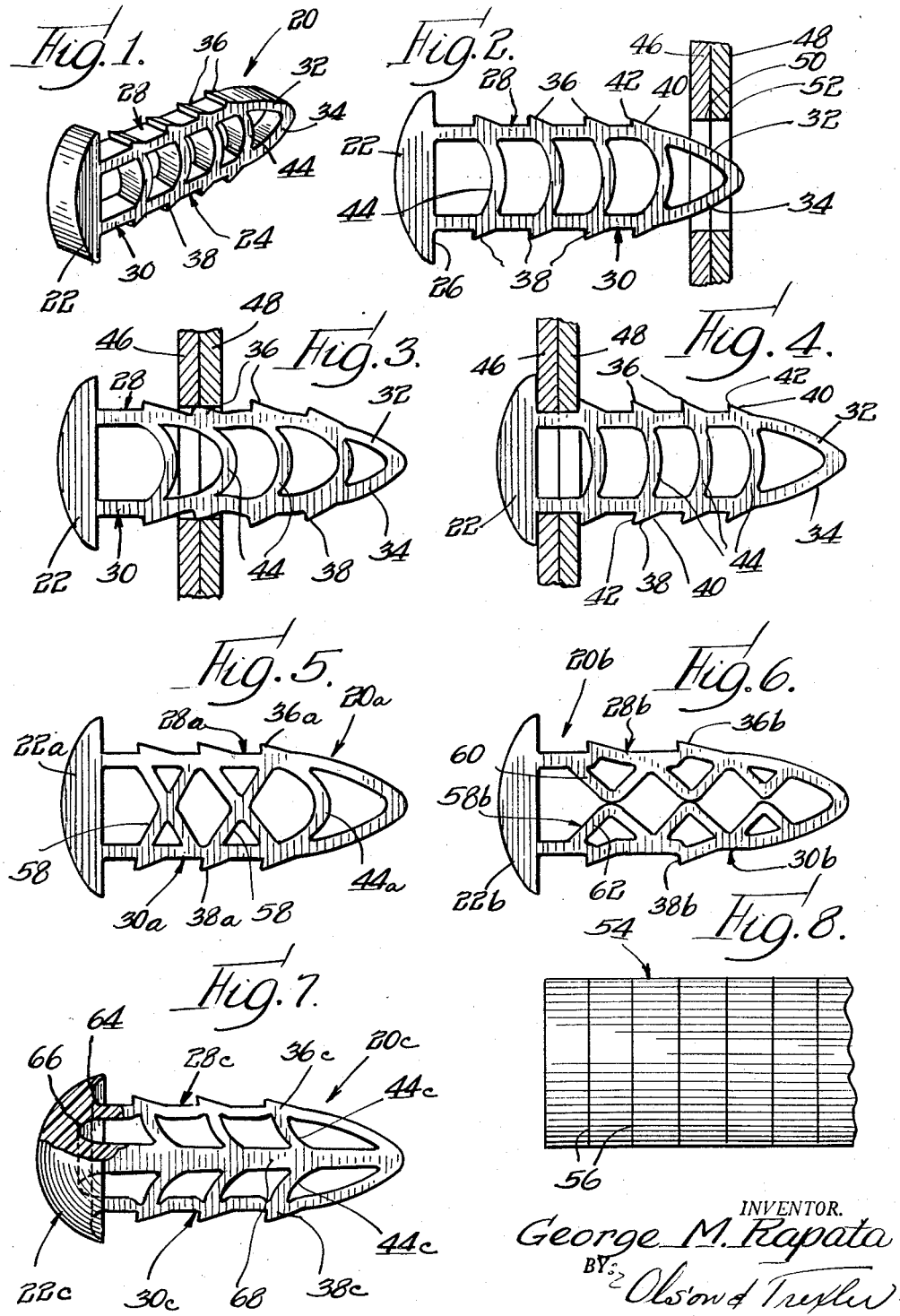

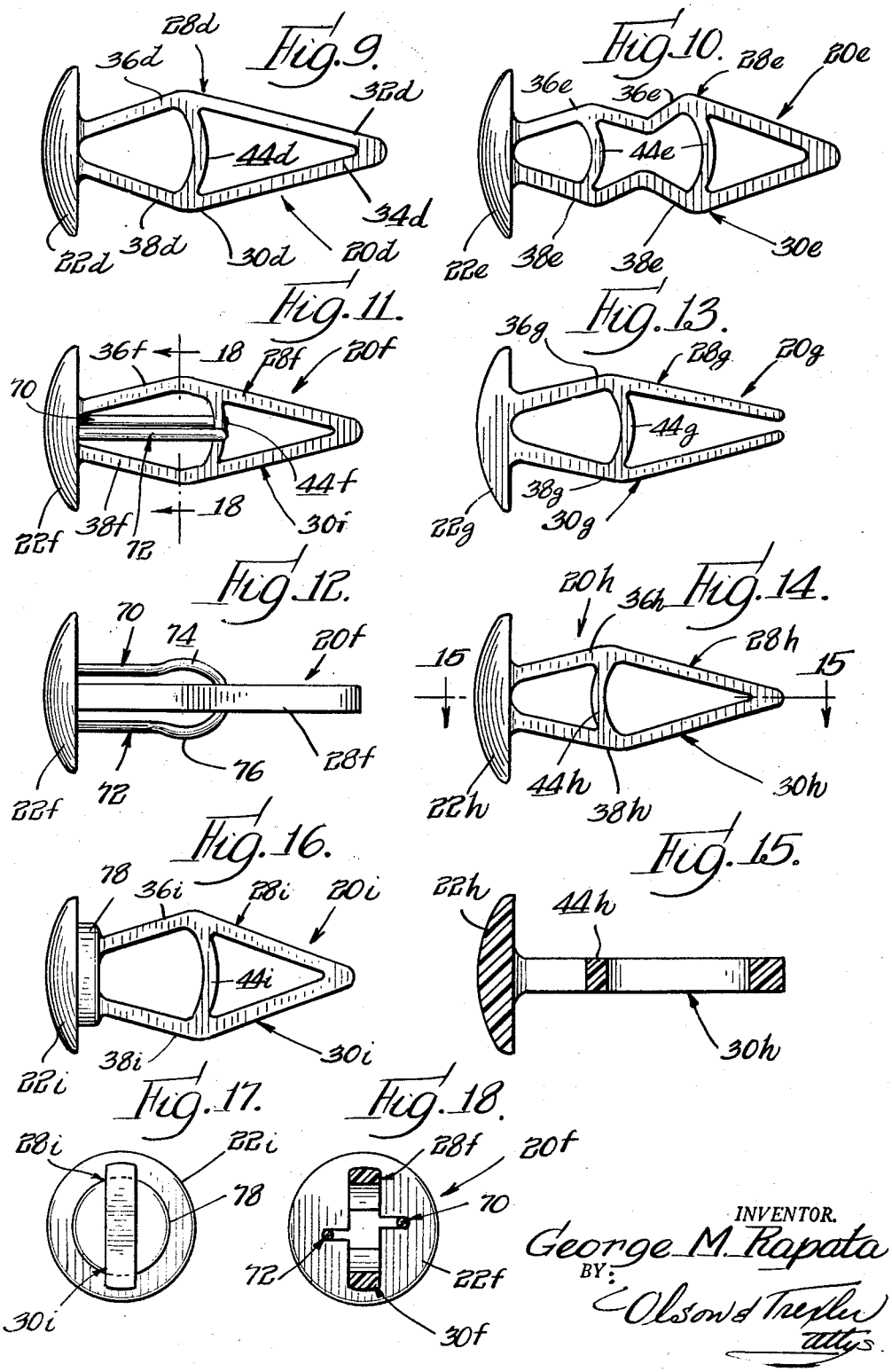

2,909,957
Patented Oct. 27, 1959

2,909,957

RESILIENT PLASTIC FASTENER WITH STRUT SUPPORTED LEGS

George M. Rapata, Park Ridge, Ill., assignor to Illinois Tool Works, Chicago, Ill., a corporation of Illinois Application April 26, 1956, Serial No. 580,926

7 Claims. (Cl. 85—5)

The present invention relates to novel fastener devices, and, more particularly, to novel fasteners of the type generally referred to as drive fasteners.

An important object of the present invention is to provide a novel fastener device adapted to be applied to an apertured work structure, which fastener device comprises a shank portion that may be relatively easily radially collapsed for facilitating application thereof to the work structure, the shank portion at the same time effectively resisting radially collapsing when forces are applied to the fastener tending to remove the fastener from the work structure whereby the fastener has highly desirable holding characteristics.

Another object of the present invention is to provide a novel fastener of the above described type which is of simple one-piece construction whereby to permit the fastener to be economically produced by molding or by severing successive fasteners from an extruded strip of stock material.

Another object of the present invention is to provide a novel fastener which requires reduced amounts of stock material while still having highly desirable holding characteristics.

A more specific object of the present invention is to provide a novel drive fastener constructed so that shank elements thereof may be relatively easily radially inwardly collapsed for facilitating application to a work structure, and also so that the shank elements have a relatively high resistance to axial collapsing so as to reduce any possibility of injury to the fastener while it is being driven into the work structure.

Other objects and advantages of the present invention will become apparent from the following description and the accompanying drawing wherein:

Fig. 1 is a perspective view showing a fastener device embodying one form of the present invention;

Figs. 2, 3 and 4 are partial sectional views respectively showing the fastener device of Fig. 1 in various stages of assembly with a work structure;

Fig. 5 is a side view showing a modified form of this invention;

Fig. 6 is a side view showing a further modified form of the invention;

Fig. 7 is a side view showing another modified form of the present invention;

Fig. 8 is a fragmentary plan view of a strip of extruded stock material from which fastener devices of the present invention may be severed;

Fig. 9 is a side view showing another modified form of the present invention;

Fig. 10 is a side view showing still another modified form of the present invention;

Figs. 11 and 12 are respectively different side views of a fastener device embodying a further modified form of the present invention;

Fig. 13 is a side view showing another modified form of the present invention;

Fig. 14 is a side view showing still another modified form of the present invention;

Fig. 15 is a sectional view taken along line 15—15 in Fig. 14;

Figs. 16 and 17 are, respectively, a side view and an entering end view of a fastener device embodying still another modified form of the present invention; and Fig. 18 is a cross sectional view taken along line 18—18 in Fig. 11.

Referring now more specifically to the drawings wherein like parts are designated by the same numerals throughout the various figures, a drive fastener 20 embodying features of the present invention is shown in Figs. 1 through 4. The fastener 20 is formed in one piece, preferably from resilient plastic material, and comprises a head portion 22 and a generally axially extending shank portion 24. In this embodiment a work engaging face 26 of the head portion is generally rectangular and has an elongated relatively narrow configuration.

The shank portion 24 comprises a pair of opposed generally axially extending elements 28 and 30 which are substantially spaced radially from opposite sides of the longitudinal axis of the fastener. Each of the elements 28 and 30 has a narrow width substantially equal to the minor dimension of the work engaging face 26. In addition, each of the elements 28 and 30 has a relatively thin radial dimension so that these narrow and thin resilient elements may be radially flexed or collapsed relatively easily during application of the fastener to an apertured work structure. Preferably entering end portions 32 and 34 of the shank elements 28 and 30 converge toward each other and are integrally joined.

Shoulder or prong means 36 and 38 are spaced axially along the shank elements 28 and 30 respectively. Each of these shoulder or prong means has a cam surface 40 disposed toward the entering end of the fastener for facilitating passage of the fastener through a work structure aperture. Each of these shoulder means also has a shoulder or work engaging surface 42 facing toward the head portion 26 and extending radially outwardly and inclined slightly toward the head portion.

In order to provide the shank elements 28 and 30 with relatively great resistance to radial collapsing under the influence of forces tending to remove the fastener from a work structure while enabling the elements 28 and 30 to collapse radially during application of the fastener to the work structure, the shank portion is provided with a plurality of axially spaced ribs or strut elements 44. Opposite ends of each of the strut elements 44 are respectively integrally joined to the shank elements 28 and 30 at locations substantially in radial alignment with a pair of shoulder or prong means 36 and 38. The resilient strut elements 44 are relatively thin and flexible and are formed so that they are initially curved or bowed axially of the fastener.

The fastener device 20 is adapted to be applied to any suitable work structure, which, for example, may include a pair of work pieces or panel members 46 and 48, respectively, having apertures 50 and 52 therethrough. It will be appreciated that the spacing of the shoulder means or prongs axially of the shank portion adapts the fastener for application to work structures of various thicknesses. The fastener may be easily applied to the apertured work structure merely by forcing it axially through the aligned apertures as shown in Fig. 3. As the shank portion passes through the aperture, successive increments of the elements 28 and 30 and successive rib or strut elements 44 are radially collapsed sufficiently to permit the shoulder means or prongs to pass through the workpiece aperture.

The curved or bowed formation of the ribs or strut elements promotes radial collapsing of the shank portion during application of the fastener and thereby facilitates passage of the shank portion through the work structure. When the fastener is fully applied to the work structure as shown in Fig. 4, the resilient shank elements 28 and 30 spring radially outwardly toward their normal positions to locate a pair of the prongs 36 and 38 for engagement with the inner surface of the work structure. It will be appreciated that the transverse ribs or struts 44 greatly aid in retaining the shank elements 28 and 30 against radial collapsing after the fastener has been fully applied so as to prevent the prongs or shoulder means from becoming disengaged from the work structure. Furthermore, it should be noted that the above mentioned reverse inclination of the shoulder surfaces 42 aids in transmitting any tension forces tending to pull the fastener out of the work structure to the shank elements 28 and 30 and to opposite ends of an adjacent transverse strut or rib 44 in a manner which tends to straighten the curved or bowed rib. As a result of the tendency of the rib to straighten rather than to collapse when tension is applied to the fastener, the rib will tend to radially expand the shank elements 28 and 30 so as to urge the shoulder means or prongs more aggressively into engagement with the work structure.

The fastener 20 may be molded, if desired, from any suitable material, but in view of its symmetrical configuration it is especially adapted to be formed from a strip of extruded stock material. Fig. 8 shows a strip 54 of extruded stock material from which fastener devices 20 may be formed merely by severing the strip along successive lines 56. It is understood, of course, that the strip 54 may be extruded by suitable means so as to have a cross sectional configuration identical to the configuration of the fastener device 20 as shown in Fig. 2.

Fig. 5 shows an embodiment of the present invention which is similar to the above described structure as indicated by the application of identical reference numerals with the suffix "a" added to corresponding elements. In this embodiment scissors-like transverse strut or rib means 58 are provided. As a result of the scissors-type strut means, the entire shank portion is axially extended and radially collapsed when the first set of prongs or shoulder elements adjacent the entering end of the fastener are collapsed upon engagement with the workpiece so as to facilitate passage of the remaining prongs through the workpiece apertures.

Fig. 6 shows a fastener 20b embodying the modification of the device shown in Fig. 5. In this embodiment the scissors-like rib means 58b are respectively provided by separate V-shaped sections 60 and 62 having abutting inner ends and outer ends integrally connected to the axially extending shank elements axially of opposite ends of adjacent prongs or shoulder means. In this embodiment axial extension and radial collapsing of the shank portion is also accomplished when a pair of the shoulder or prong means is collapsed during application of the fastener to the work structure.

Fig. 7 shows a fastener device 20c embodying another modified form of the present invention. In this embodiment the head portion 22 is rounded and is made axially collapsible by the provision of annular recesses 64 and 66. In addition, an axially extending pin 68 is provided which has its opposite ends respectively integrally connected with the head portion and with the entering end portions of the shank elements 28c and 30c. With this embodiment, the head portion is axially collapsed when pressure is applied thereto during application of the fastener to a work structure so that the pin element 68 applies tension to the shank elements 28c and 30c. This tends to elongate and radially collapse the shank elements so as to facilitate application of the fastener. In addition, the ribs or struts 44c extend between the pin element 68 and portions of the shank elements 28c and 30c which are formed to provide the shoulder or protuberance means 36c and 38c so that when the pin element is axially shifted upon collapsing of the head portion, the locking prongs are pulled inwardly further to promote easy application of the fastener to the work structure. Then when the fastener is fully applied and the pressure is relieved from the head portion 22 so that it and the pin element 68 return toward their normal positions, the strut elements urge and retain the shoulder or prong means radially outwardly for engagement with the work structure.

Fig. 9 shows a fastener device 20d wherein the generally axially extending shank elements 28d and 30d have portions diverging with respect to each other from the head portion so as to provide shoulder means 36d and 38d engageable with an inner or back surface of a work structure.

Fig. 10 shows a fastener 20e which is similar to the device shown in Fig. 9 except that the shank elements 28e and 30e are provided with two pairs of diverging portions for providing two pairs of work engaging shoulder means. As shown in the drawings, these pairs of diverging portions may extend laterally or radially different amounts so that the fastener is adapted to be applied to workpieces having apertures of different sizes.

Figs. 11, 12 and 18 show a fastener device 20f which is similar to the structure shown in Fig. 9 except that opposite generally axially extending side ribs 70 and 72 are provided which have their opposite ends respectively integral with the head portion and with the transverse rib 44f. During application of this fastener device to an apertured work structure, outwardly bowed portions 74 and 76 of the side ribs are collapsed inwardly by margins of the work structure. When this occurs, the transverse rib portion 44 is axially deflected and collapsed so as to faciliate collapsing of the shoulder means 36f and 38f. When the fastener has been fully applied to the work structure, the bowed portions 74 and 76 of the side ribs return toward their normal positions and thereby apply forces aiding the inherent resiliency of the transverse rib 44f and the shank elements in biasing the shoulder portions into engagement with the work structure.

Fig. 13 shows a fastener device 20g which is similar to the embodiment shown in Fig. 9 except that the entering ends of the shank elements 28g and 30g are separated. This structure promotes easier collapsing of the shank elements during application of the fastener to an apertured work structure.

Figs. 14 and 15 show a fastener 20h which is similar to embodiments described above as indicated by the application of identical reference numerals with the suffix "h" added to corresponding elements. This embodiment illustrates how fasteners which are satisfactory for many purposes may be provided with a transverse rib element 44g which is initially bowed axially toward the head portion rather than toward the entering end of the fastener.

Figs. 16 and 17 show a fastener device 20i which is similar to the embodiment shown in Fig. 9 as indicated by the application of identical reference numerals with the suffix "i" added to corresponding elements. In this embodiment an integral axially extending circular abutment or collar 78 is provided between the head portion 22i and the shank elements. This solid abutment is adapted to extend into a workpiece aperture for locating the fastener centrally within the aperture and for absorbing any shear stresses which may be applied to the fastener when it is assembled with a workpiece.

While the preferred embodiments of the present invention have been shown and described herein, it is obvious that many structural details may be changed without departing from the spirit and scope of the appended claims.

The invention is claimed as follows:
1. A one-piece resilient fastener made of synthetic resin plastic material and comprising a substantially solid head, a plurality of radially spaced relatively narrow and flexible shank elements connected to and extending generally axially from said head and terminating remote from said head in converging portions presenting a narrow entering end portion facilitating initial application of the fastener into a complementary workpiece aperture, work engaging shoulder means peripherally associated with said shank elements and facing generally toward said head, and resilient narrow strut means integrally connected with said shank elements in the vicinity of said shoulder means extending laterally between the shank elements and being of substantially no greater width than said shank elements, said strut means forming with said shank elements a plurality of pockets between the head and entering end portion, said pockets being substantially closed at each axial extremity but completely transversing said shank elements whereby to facilitate radial collapse of the strut means with inward movement of the shank elements and shoulder means during application of the fastener to the apertured workpiece, said shank elements and strut means being substantially rectangular in cross section, portions of each strut means adjacent the shank elements extending in an inclined direction therefrom relative to the longitudinal axis of the fastener for a distance greater than the thickness of said strut means, said strut means operating to promote radial expansion of the shank elements and shoulder means when the fastener is fully applied to the workpiece.

2. A fastener, as defined in claim 1, wherein said strut means comprises a scissors-type rib structure for effecting, upon collapsing of initial portions of said shank elements, axial extension and radial collapsing of additional portions of the shank elements.

3. A fastener, as defined in claim 2, wherein said scissors-type rib structure includes separate opposed generally V-shaped sections having abutting closed ends.

4. A fastener, as defined in claim 1, wherein said shoulder means is provided by diverging portions of said shank elements.

5. A fastener, as defined in claim 1, which includes means extending axially between said shank elements and having opposite ends respectively integrally connected to said head portion and to said generally transversely disposed strut means integrally connecting said shank elements.

6. A fastener, as defined in claim 1, which includes a plurality of shoulder means spaced axially on said shank elements, and wherein said narrow means includes a plurality of axially spaced transversely disposed ribs having ends joined to said shank elements adjacent the shoulder means.

7. A fastener, as defined in claim 1, wherein all opposite side surfaces of said head portion, shank elements, shoulder means, and narrow means are disposed in a pair of parallel planes, and wherein all other surfaces of the fastener are disposed perpendicularly to said planes so as to enable the fastener to be formed by extrusion.

References Cited in the file of this patent

UNITED STATES PATENTS

| | | |
|---|---|---|
| 2,193,951 | Van Uum | Mar. 19, 1940 |
| 2,229,996 | Churchill | Jan. 28, 1941 |
| 2,267,511 | Van Uum | Dec. 23, 1941 |
| 2,526,622 | Martin | Oct. 24, 1950 |
| 2,585,438 | Clingman | Feb. 12, 1952 |
| 2,610,879 | Pope | Sept. 16, 1952 |
| 2,754,561 | Bedford | July 17, 1956 |

FOREIGN PATENTS

| | | |
|---|---|---|
| 745,788 | Great Britain | Feb. 29, 1956 |